(No Model.)
J. MATTHEWS, Dec'd.
G. MATTHEWS, executor.
PROCESS OF FILLING BOTTLES WITH AERATED BEVERAGES.
No. 311,998. Patented Feb. 10, 1885.
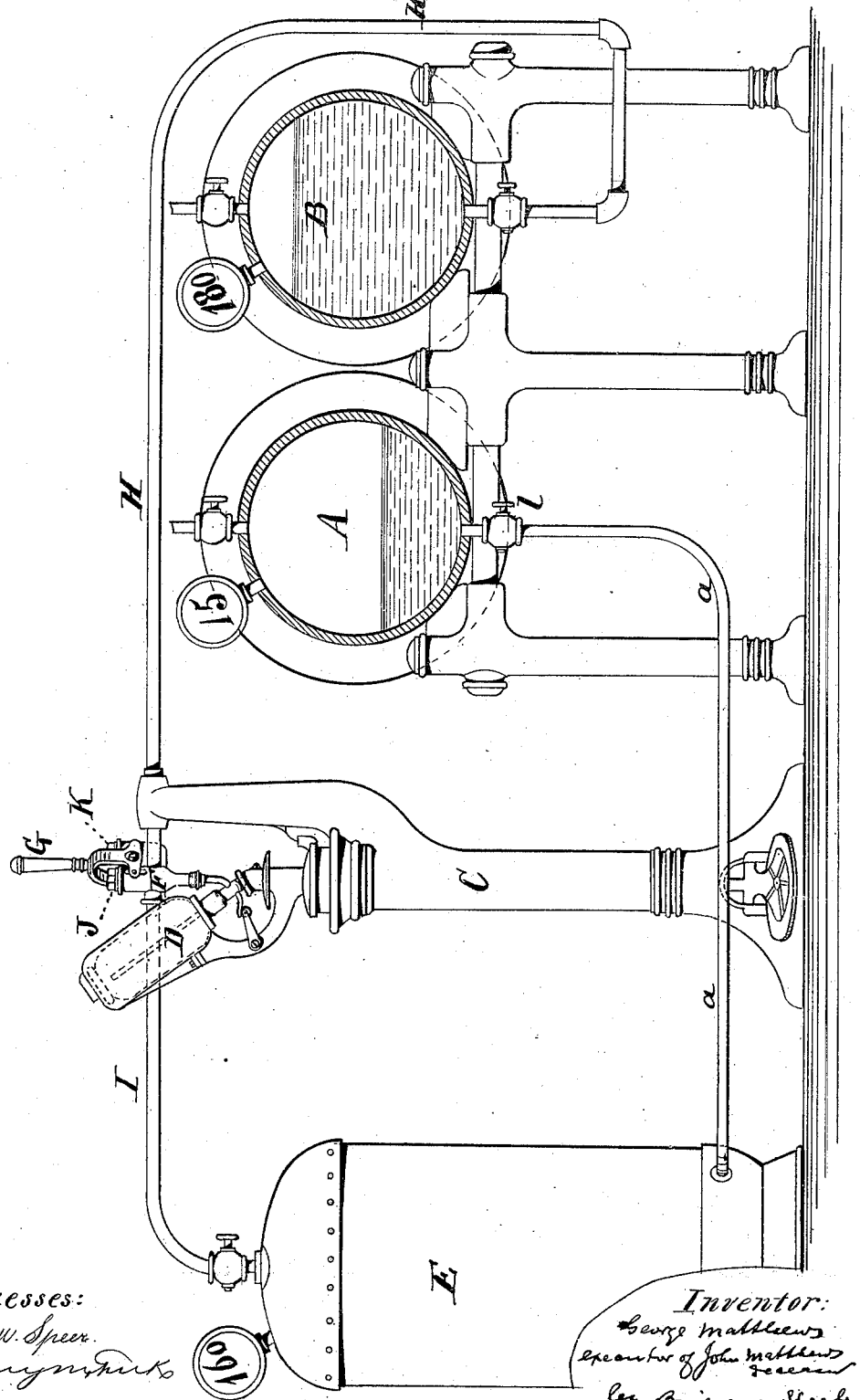
Witnesses:
John W. Speer.
Harry M. Turk
Inventor:
George Matthews
executor of John Matthews deceased
by Briesen & Steele
attorneys

UNITED STATES PATENT OFFICE.

GEORGE MATTHEWS, OF NEW YORK, N. Y., EXECUTOR OF JOHN MATTHEWS, DECEASED.

PROCESS OF FILLING BOTTLES WITH AERATED BEVERAGES.

SPECIFICATION forming part of Letters Patent No. 311,998, dated February 10, 1885.

Application filed February 9, 1884. (No model.)

*To all whom it may concern:*

Be it known that JOHN MATTHEWS, deceased, late of New York city, in the county and State of New York, during his life-time did invent an Improved Process of Filling Siphon-Bottles with Aerated Beverages, of which the following is a full, clear, and exact description, reference being made to the accompanying drawing.

The drawing represents a sectional elevation of apparatus for carrying said process into effect.

This invention relates to a new process for filling siphon-bottles and other vessels having very narrow inlet-openings with aerated beverages.

It consists in first letting gas into such a bottle, then closing the gas-supply, then letting in water under greater pressure than the gas, then opening the gas-supply and letting out the surplus gas, closing it again and letting in more of the water, and so forth, until the bottle has been properly charged.

It is not new to charge vessels with gas and then, while the gas-inlet is open, with water, the water being under greater pressure than the gas. Such a process is described in Patents No. 246,967 and No. 260,766; but in filling siphon-bottles having long and slender inlet-pipes the gas will not escape therefrom while the water is being admitted; hence the bottle must be first charged with gas, and then the water admitted to compress and cushion such gas. Then the surplus gas must be discharged, and then water again admitted, and so forth.

In the drawing, E represents a vessel containing gas at, say, one hundred and sixty pounds pressure per square inch. B is a vessel containing water under greater pressure—say one hundred and eighty pounds to the square inch. C is the stand of the siphon-filler; F, the filling-head; D, the siphon to be filled. I is a pipe leading from the vessel E to the filling-head F. H is a pipe leading from the vessel B to the filling-head F. J is a valve for closing the pipe I. K is a valve for closing the pipe H. G is a lever by which said valves can be opened.

The apparatus, so far as described, is of well-known construction.

A is a vessel which communicates by a pipe, *a*, with the vessel E. The pipe *a* has a valve, *l*. After the siphon is placed in the siphon-filler the gas-valve is opened and the siphon charged with gas to about one hundred and sixty pounds. Then the carbonated-water-supply valve K is opened and communication established with the carbonade or water reservoir B. The gas-valve J is closed. The water now flows into the siphon against the gas-pressure therein, and the carbonade does not lose much of its gas. The valve J is again opened as soon as the water ceases to flow, and the valve K is closed. This permits the gas which is compressed in the siphon at about one hundred and eighty pounds to flow into the vessel E until the pressure is equalized. Water is then admitted to the siphon from the vessel B, (the valve J being again closed,) and this is repeated until the siphon is filled to the required height. As the pressure in the vessel E is gradually raised by this process, the stop-cock or valve *l* is occasionally opened, and the gas and water accumulated in the vessel E discharged into the vessel A, where it can be utilized to carbonate water or for other purposes.

Having thus described the invention, what is claimed is—

The process herein described of charging siphon-bottles having single narrow opening with aerated beverages, which process consists in first charging the bottle with gas, then, while the gas-connection is closed, charging it with water which is under greater pressure than the gas, thereby compressing the gas within the bottle, then, when the compression has been established and water ceases to flow, closing the water-connection, reopening the gas-connection, and discharging the surplus gas, then again closing the gas-connection, and opening the water-connection and letting in more water, all as specified.

This specification of the invention of the said JOHN MATTHEWS, deceased, signed by me this 1st day of February, 1884.

GEORGE MATTHEWS,
*Executor.*

Witnesses:
GEORGE MATTHEWS, Jr.,
H. P. RAFTERY.